Oct. 26, 1971     H. L. LICKEY     3,615,073
WHEEL LIFT ASSIST
Filed Nov. 1, 1968
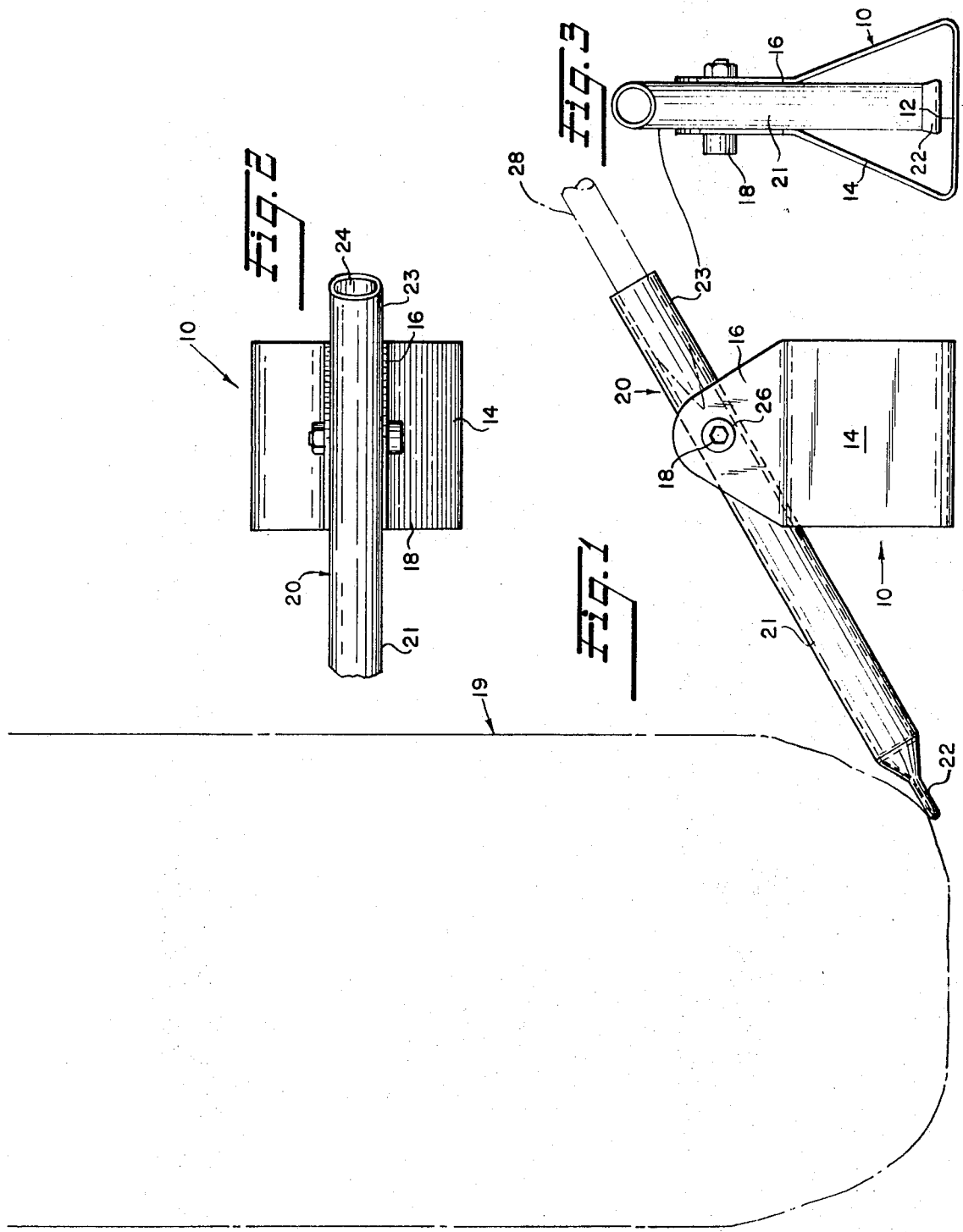
INVENTOR.
HOWARD L. LICKEY
BY

United States Patent Office 3,615,073
Patented Oct. 26, 1971

3,615,073
WHEEL LIFT ASSIST
Howard L. Lickey, 115 Bosworth St., Slidell, La. 70458
Filed Nov. 1, 1968, Ser. No. 772,513
Int. Cl. B66f 3/00
U.S. Cl. 254—131                    1 Claim

ABSTRACT OF THE DISCLOSURE

The invention involves a simple compact wheel lift for vehicles which lifts and simultaneously urges the wheel toward the vehicle.

---

The removal or replacement of a wheel on a modern automobile is a difficult and awkward task. The fenders of modern automobiles usually extend downward over the wheels and partially enclose them and the wheel and tire assembly is relatively heavy. To replace a wheel it is necessary to align the holes of a wheel with the lugs or bolts on the hub and this requires lifting and turning of the wheel from an off-balance position such that it is very easy for a person to injure or strain himself while removing or replacing a wheel.

There have been suggestions for overcoming these difficulties but these suggestions have involved or introduced other disadvantages. These suggestions involve lifting the automobile's body sufficiently high that the fender substantially clears the top of a wheel and tire but this system urges the car to move, and requires blocking the other wheels against movement since any slip or movement could seriously damage the car or injure the person removing or replacing the wheel.

Other suggestions have involved relatively heavy, complex and expensive holders for wheel and tire but these holders are not only difficult to operate but take up substantial space in the trunk of the vehicle.

The present invention overcomes these difficulties by a simple, inexpensive, rugged, two piece lever arrangement which folds into a small compact package and does not require substantial space in the vehicle trunk. Any available rod such as the lug wrench can supply the lever extension for lifting the vehicle wheel and the person removing or replacing the wheel can easily lift the wheel with one hand and use the other hand to align the bolt holes on the wheel with the bolts on the hub. It is not necessary that the person maintains an awkward unbalanced position to accomplish this operation.

One of the objects of the present invention is to provide a simple, efficient and compact device for supporting the weight of a vehicle wheel while the wheel is being removed or replaced.

Another object is to provide a simple, inexpensive, compact unit for lifting and holding a vehicle wheel during removel from or attachment to the vehicle.

Another object is to provide a vehicle wheel lifter which may be folded into a compact form for storage in the vehicle trunk.

Another object is to provide a manual wheel lift which engages the wheel and tire at the outer edge so that the wheel is urged toward the vehicle.

The wheel lift assist is important not only for the convenience and protection of the user but to prevent damage to the vehicle. In the removal or placement of vehicle tires especially large heavy truck tires, the wheel and tire are sufficiently heavy to score the threads on the lug bolts unless the wheel and tire are supported during removal or replacement. Damage to the lug bolts is enough to render them unusable and very often, particularly, in the case of trucks, the lug bolts are damaged so that only a few remain usable.

Referring to the drawing:

FIG. 1 is a side elevation of a wheel lift assist according to the present invention.

FIG. 2 is a fragmentary top plan view thereof.

FIG. 3 is a fragmentary rear elevation thereof.

As shown in FIG. 1, the wheel lift assist of the present invention comprises a support member indicated generally at 10. This support member consists of a single piece of metal sheet or strap which, has a flat ground engaging portion 12. On either side of the ground engaging portion 12 the metal sheet or strap is bent upwardly to form sides 14 of a substantially isosceles triangle and adjacent the apex of the triangle the side portions are bent vertically upward to form two spaced ears 16. These ears are perforated to receive a bolt 18.

The lever arm or lift member 20 consists of a length of metal tube or pipe which is flattened as indicated at 22 to engage the outer edge of the wheel indicated at 19 and the other arm 23 is open at its end as indicated at 24. Intermediate its ends, the lever or lift member is provided with an opening not shown to receive the bolt 18.

The wheel lift assist is assembled by placing the assist lever 20 between the ears 16 and inserting the bolt 18 through the ear and lever to form a fulcrum. Suitable lock washers 26 are provided to prevent accidental loosening of the bolt.

It is to be noted that the arm 23 of the lever having the open end 24 is shorter than the wheel engaging arm 21 and preferably is shorter than the distance from the bolt 18 to the ground engaging portion 12 of the support 10. This end of the lever is left open to receive a supplemental member 28 for increasing effective length of the lever arm 23 thereby increasing the mechanical advantage of the lever. This open end will receive commonly available objects such as a lug wrench, or the like. The arm 23 is shorter than the distance between the bolt 18 and the ground engaging portion 12 of the support 10 so that when not in use, the arm 23 can be folded into the base or support 10 so that the maximum length of the device is not substantially greater than the length of the lever. Because of this construction the wheel lift assist of the present invention will lie flat in the trunk compartment of an automobile or truck and will hang flat against the wall of a garage or other structures. Because of the open end 24 the lever arm 23 may be made much shorter than would normally be required to obtain the proper mechanical advantage and yet the effective length of the arm may be increased with the use of tools or other items which are conveniently available.

For example, if a wheel is to be changed or replaced, a lug wrench is essential and will therefore be available. When the end of this lug wrench is inserted in the open end 24 of the lever arm 23 the effective length, and the mechanical advantage of the lever is substantially increased so that less downward pressure is required to lift and hold the wheel and tire while aligning the wheel openings with the lugs.

One of the principal advantages of the wheel lift assist of the present invention is that it is constructed of so few simple parts. The support 10 consists of a single piece of metal sheet or strap which can be bent to the form shown in FIG. 2 by hand or by a simple jig or fixture. The flat end portion 22 may be formed by a hand tool or by a simple press and the only other operations required to produce the wheel lift assist of the present invention is to drill the bolt holes in the ears 16 and pipe 20 and to insert and secure the bolt 18.

For example, the support member can be made from a single sheet of mild steel 3 or 4 inches wide and 13 to 15 inches long. The lever arm can be made from a piece of mild steel tubing or pipe about 12 inches long and having an outside diameter of about .81 inch and an inside diameter of about .68 inch. A standard ¼ inch steel bolt about 1.5 or 2 inches long is satisfactory. These dimensions are obviously not restrictive but merely illustrative of the fact that the wheel lift assist of the present invention can be produced from inexpensive, common, easily obtained materials. Because these materials are so common and because the parts are so few and so small, satisfactory material can often be obtained as scrap or waste from a mill or factory.

A major feature of the present wheel lift assist is its small size and when folded flat for storage, the unit has a maximum width of 3 or 4 inches, a maximum height of 3 or 4 inches and a maximum length of 11 or 12 inches.

The fulcrum of the wheel lift assist of the present invention is low, approximately the height of the tire, and the lever arm engages the outside edge of the tire at the bottom. When the tire and the wheel are lifted, the tire and wheel tend to swing toward the car so that there is no need to steady the wheel against outward movement and when the openings in the wheel aligned with the lugs on the drum, the wheel swings toward the drum so that the lug enters the opening. When the top lug enters the top opening in the wheel the wheel lift assist can be released and the wheel swings by gravity on the top lug and all of the lugs enter all of the openings in the wheel.

I claim:
1. A wheel lift comprising a support having a flat ground engaging portion and a pair of spaced ears extending upwardly from said ground engaging portion, a lever pivoted on said support between said ears, one arm of said lever having means at its free end for engaging the outer bottom edge of said wheel to raise said wheel and to urge said wheel to pivot toward the vehicle, the other arm of said lever being shorter than the distance between the pivot and ground engaging portion of said support so that said other arm may be folded into said support between said ears, and said other arm being provided with means for receiving one end of a removable extension means to increase the length of said lever.

References Cited
UNITED STATES PATENTS

| | | | |
|---|---|---|---|
| 935,727 | 10/1909 | Anderson | 254—131 |
| 1,455,464 | 5/1923 | Welker | 254—131 |
| 1,981,763 | 11/1934 | Usadel | 254—131 |
| 2,619,320 | 11/1952 | Miller | 254—131 |

ROBERT C. RIORDON, Primary Examiner
D. R. MELTON, Assistant Examiner